United States Patent
Reinhoudt et al.

(10) Patent No.: US 8,730,650 B2
(45) Date of Patent: May 20, 2014

(54) WATER PURIFICATION DEVICE

(75) Inventors: Hank Robert Reinhoudt, Delft (NL);
Albert Van Der Wal, Oegstgeest (NL);
Elodie Helene Mado Taboulot, Dijon (FR)

(73) Assignee: Voltea Limited, London (GB)

( * ) Notice: Subject to any disclaimer, the term of this patent is extended or adjusted under 35 U.S.C. 154(b) by 478 days.

(21) Appl. No.: 12/742,340

(22) PCT Filed: Nov. 5, 2008

(86) PCT No.: PCT/EP2008/064992
§ 371 (c)(1),
(2), (4) Date: Sep. 17, 2010

(87) PCT Pub. No.: WO2009/062872
PCT Pub. Date: May 22, 2009

(65) Prior Publication Data
US 2010/0328841 A1 Dec. 30, 2010

(30) Foreign Application Priority Data

Nov. 13, 2007 (EP) ..................................... 07120525

(51) Int. Cl.
*H01G 4/30* (2006.01)
*B05D 5/12* (2006.01)

(52) U.S. Cl.
USPC ........ 361/528; 361/301.4; 361/508; 361/516; 361/523; 361/532; 427/80; 29/25.03

(58) Field of Classification Search
USPC .............. 361/301.4, 508, 516, 523, 532, 528; 29/25.03; 427/80; 252/502; 204/630
See application file for complete search history.

(56) References Cited

U.S. PATENT DOCUMENTS

| | | | | |
|---|---|---|---|---|
| 3,293,507 A | * | 12/1966 | Smith | 361/518 |
| 3,466,508 A | * | 9/1969 | Booe | 361/536 |
| 3,687,829 A | | 8/1972 | Factor | 205/742 |
| 3,828,227 A | * | 8/1974 | Millard et al. | 361/540 |
| 3,970,903 A | * | 7/1976 | Shirn | 361/533 |
| 4,090,288 A | * | 5/1978 | Thompson et al. | 29/25.03 |
| 4,203,194 A | * | 5/1980 | McGrath | 29/25.03 |
| 4,571,664 A | * | 2/1986 | Hyland | 361/540 |
| 4,660,127 A | * | 4/1987 | Gunter | 361/540 |
| 5,192,432 A | | 3/1993 | Andelman | |
| 5,196,115 A | | 3/1993 | Andelman | |
| 5,200,068 A | | 4/1993 | Andelman | |
| 5,360,540 A | | 11/1994 | Andelman | |
| 5,410,445 A | * | 4/1995 | Kanetake | 361/539 |

(Continued)

FOREIGN PATENT DOCUMENTS

EP   0 861 114 B1   9/1998
EP   1 769 116      4/2007

(Continued)

OTHER PUBLICATIONS

International Search Report dated Mar. 2, 2009 as issued for PCT/EP2008/064992.

*Primary Examiner* — Anatoly Vortman
(74) *Attorney, Agent, or Firm* — Pillsbury Winthrop Shaw Pittman LLP

(57) ABSTRACT

Improved flow through capacitors (FTC) and methods for purifying aqueous solutions are disclosed. For example, FTC electrodes that are activated with a poly-electrolyte are disclosed.

20 Claims, 2 Drawing Sheets

(56) References Cited

U.S. PATENT DOCUMENTS

| | | | |
|---|---|---|---|
| 5,415,768 A | 5/1995 | Andelman | |
| 5,538,611 A | 7/1996 | Otowa | |
| 5,547,581 A | 8/1996 | Andelman | |
| 5,620,597 A | 4/1997 | Andelman | |
| 5,748,437 A | 5/1998 | Andelman | |
| 5,779,891 A | 7/1998 | Andelman | |
| 5,954,937 A | 9/1999 | Farmer | 205/687 |
| 6,110,354 A | 8/2000 | Saban et al. | |
| 6,127,474 A | 10/2000 | Andelman | |
| 6,183,914 B1 | 2/2001 | Yao et al. | |
| 6,214,204 B1 | 4/2001 | Gadkaree et al. | |
| 6,238,444 B1* | 5/2001 | Cadwallader | 29/25.03 |
| 6,297,293 B1 | 10/2001 | Bell et al. | 521/99 |
| 6,309,532 B1 | 10/2001 | Tran et al. | 205/687 |
| 6,709,560 B2 | 3/2004 | Andelman et al. | 204/630 |
| 6,970,345 B2* | 11/2005 | Oh et al. | 361/540 |
| 7,206,189 B2 | 4/2007 | Reynolds, III | 361/502 |
| 7,443,653 B2* | 10/2008 | Kim et al. | 361/523 |
| 7,570,480 B2* | 8/2009 | Kim et al. | 361/540 |
| 2003/0218858 A1* | 11/2003 | Kim et al. | 361/523 |
| 2004/0066607 A1* | 4/2004 | Edson et al. | 361/528 |
| 2005/0042513 A1 | 2/2005 | Curran et al. | 429/209 |
| 2005/0079409 A1* | 4/2005 | Andelman et al. | 429/94 |
| 2005/0088805 A1* | 4/2005 | Edson et al. | 361/529 |
| 2005/0103634 A1 | 5/2005 | Andelman et al. | 204/630 |
| 2006/0260109 A1* | 11/2006 | Vaisman et al. | 29/25.41 |
| 2006/0262489 A1* | 11/2006 | Vaisman et al. | 361/540 |
| 2007/0177333 A1* | 8/2007 | Umemoto et al. | 361/502 |
| 2007/0279841 A1* | 12/2007 | Kim et al. | 361/540 |
| 2008/0019081 A1* | 1/2008 | Kim et al. | 361/535 |
| 2008/0062617 A1* | 3/2008 | Edson et al. | 361/529 |
| 2008/0080124 A1* | 4/2008 | Kim et al. | 361/529 |
| 2009/0090627 A1 | 4/2009 | Andelman et al. | |
| 2009/0154065 A1* | 6/2009 | Choi et al. | 361/523 |
| 2009/0154066 A1* | 6/2009 | Choi et al. | 361/523 |
| 2009/0154068 A1* | 6/2009 | Choi et al. | 361/533 |

FOREIGN PATENT DOCUMENTS

| | | | | |
|---|---|---|---|---|
| EP | 1863044 A1 * | 12/2007 | | H01G 9/00 |
| WO | WO 01/30229 A1 | 5/2001 | | |
| WO | WO 02/086195 A1 | 10/2002 | | |
| WO | WO 03/009920 A1 | 2/2003 | | |
| WO | WO 2005/106100 | 11/2005 | | |
| WO | WO 2005/112151 | 11/2005 | | |

* cited by examiner

US 8,730,650 B2

WATER PURIFICATION DEVICE

FIELD OF THE INVENTION

The present invention relates to improved flow through capacitors and methods for purifying aqueous solutions.

BACKGROUND PRIOR ART

In recent years one has become increasingly aware of the impact of human activities on the environment and the negative consequences this may have. Ways to reduce, reuse and recycle resources are becoming more important. In particular clean water is becoming a scarce commodity. Therefore, various methods and devices for purifying water have been published in recent years.

Different methods are known in the art to purify water. For the removal of ions, amongst others hardness ions ($Ca^{2+}$ and $Mg^{2+}$) ion-exchange, as disclosed in WO01/30229, or electro-deionisation (EDI), as disclosed in EP-A-1 769 116, are known in the art and commonly used. However, the ion-exchange material as used in these methods require regular regeneration. Further disadvantages of ion-exchange are the limited life-time of the ion-exchange resin and/or the required volume of resin for the production of the amount of soft water, such as in a domestic appliance.

Another known method for water treatment is capacitive deionisation, using a flow through capacitor (FTC) as among others described in U.S. Pat. No. 6,309,532, EP-A-0 861 114, WO02/086195 and WO03/009920. Said method comprises the use of an electrically regenerable electrochemical cell for capacitive deionization and electrochemical purification and regeneration of the electrodes. By charging the electrode, ions are removed from the electrolyte and are held in the electric double layers at the electrodes. The cell can be (partially) regenerated electrically to desorb such previously removed ions. The regeneration could be carried out without added chemical substances.

Flow through capacitors (FTC) generally include one or more pairs of spaced apart electrodes (a cathode and an anode) with current collectors or backing layers provided that are generally adjacent to or very near the electrodes. There is also a flow path for a liquid to travel through the flow-through capacitor and contact the current collectors and electrodes. Current collectors are electrically conductive and transport charge in and out of the electrodes. A conventional FTC comprises a spacer, separating the FTC into a positive charge side and a negative charge side. A high surface area electrode is located adjacent to the spacer and also adjacent to a current collector. In the conventional FTC the layers of electrode, spacer and current collector are fastened together in a "sandwich" fashion by compressive force, normally by mechanical fastening.

In recent publications (U.S. Pat. No. 6,709,560) an improved version of the FTC technology, the so-called charge barrier Flow Through Capacitor technology, is presented, showing that a charge barrier placed adjacent to an electrode of a flow-through capacitor can compensate for the pore volume losses caused by adsorption and expulsion of pore volume ions. The term charge barrier refers to a layer of material which is permeable or semi-permeable and is capable of holding an electric charge. Pore volume ions are retained, or trapped, on the side of the charge barrier towards which the like-charged ions migrate. Generally, a charge barrier functions by forming a concentrated layer of ions. The effect of forming a concentrated layer of ions balances out, or compensates for, the losses ordinarily associated with pore volume ions. This effect allows a large increase in ionic efficiency, which in turn allows energy efficient purification of concentrated fluids.

SUMMARY

However, the charge barrier does not sufficiently improve the ion storage capacity of the electrodes. Increased ion storage capacity remains to be desired. A downside of the charge barrier is that it makes the FTC more expensive. The added layer of the charge barrier also increases the thickness of the FTC stacks.

US2005/0042513 discloses enhanced performance of PTFE based conductive sheet electrodes by the addition of dopants. An alternative method to manufacture electrodes, is disclosed in U.S. Pat. No. 6,297,293, wherein mesoporous polymer materials are suggested.

U.S. Pat. No. 7,206,189 discloses methods to manufacture composite current collector sheets, by means of mixing exfoliated graphite and electrode material, thereby forming a mixture. The drawback of such method is that, although the contact resistance may be reduced by such composite sheets, the ion storage capacity is not increased.

However, despite the above mentioned developments, the capacitance of the electrodes that are used in FTC stacks still demands improvements. At present the specific capacitance of the commercially electrodes suitable for a FTC, such as the PACMM series electrodes ex Material Methods (trademark), is in the order of 10-25 F/g. For the purpose of an embodiment of the present invention a specific capacitance of more than 25 F/g is desired, measured according to the methods as disclosed in the examples herein below.

For reference, the electrodes of electrical double layer capacitors (also known as super capacitors) in general have a specific capacitance of up to about 120 F/g, according to B. E. Conway, Electrochemical Super capacitors: Scientific Fundamentals and Technological Applications (Springer, 1999, ISBN: 0306457369). When such super capacitor electrodes are used in a FTC, the measured specific capacitance according to the method in the examples below is in the order of up to 25 F/g.

A further problem of the state of the art is that high compression forces are required to assemble FTC stacks in order to reduce the electrical contact resistance between the electrodes and the current collector.

Therefore, it is desirable, for example, to provide electrodes, for use in an FTC device, with improved ion storage capacity.

It is desirable, for example, to provide an integrated current collector and electrode to reduce the above mentioned electrical contact resistance. This also enables the manufacture of flexible stacks or even spirally wound cartridges.

It is desirable, for example, to provide a more compact FTC stack. This makes the technology more suitable for use in e.g. domestic appliances.

It has been surprisingly found that FTC electrodes that are activated with poly-electrolytes may, for example, provide improved ion storage capacity, reduce electrical contact resistance and/or allow a more compact FTC stack. For example, such electrodes have a higher ion storage capacity than electrodes that are activated in conventional ways, such as activation with monovalent salts.

Accordingly, there is provided a method for preparing a coated current collector, comprising:
preparing a coating paste comprising:
dry coating materials comprising:
50-98.5 dry mass weight % of carbon having a specific surface area of at least 500 m$^2$/g,
1-40 dry mass weight % of binder,
0.5-30 dry mass weight % of polyelectrolyte, and
20-80% based on the total paste of solvent;
applying the coating paste on a current collector; and
drying the coated current collector.

In another aspect, there is provided an electrode coating comprising:
an electrode coating comprising:
50-98.5 dry mass weight % of carbon having a specific surface area of at least 500 m$^2$/g;
1-40 dry mass weight % of binder; and
0.5-30 dry mass weight % of polyelectrolyte.

In another aspect there is provided a coated current collector, comprising
A current collector; and
An electrode coating layer comprising polyelectrolyte binder and carbon.

We have surprisingly found that the electrodes and the method to provide said electrodes, as well as the coated current collectors discussed herein can provide a higher ion storage capacity than the electrodes of the cited prior art.

These and other aspects, features and advantages will become apparent to those of ordinary skill in the art from a reading of the following detailed description and the appended claims. For the avoidance of doubt, any feature of one aspect of the present invention may be utilised in any other aspect of the invention. It is noted that the examples given in the description below are intended to clarify the invention and are not intended to limit the invention to those examples per se. Similarly, all percentages are weight/weight percentages unless otherwise indicated. Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

Figure 1:
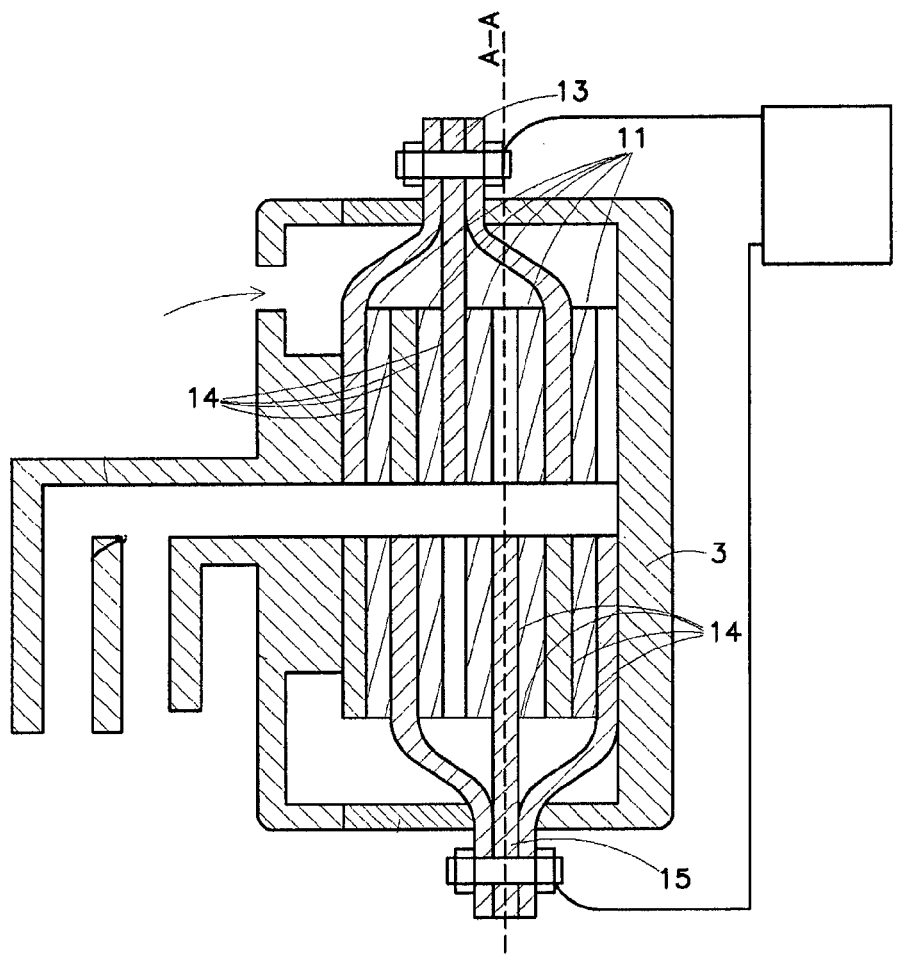
FIG. 1 shows a cross-section of an embodiment of a flow-through capacitor.

Carbon electrodes, which are used in FTC cells, are normally activated by bringing them into contact with a concentrated salt solution. High neutral salt levels in the electrode promote the ion removal capacity as well as ion conductivity and hence speed of removal. However, during use of the FTC cells, these ions can slowly leach out of electrode material, which leads to a reduced electrode overall capacity to remove salt ions from a feed water solution as well as reduced kinetics of salt removal. In addition, high salt levels are required because of the presence of pore volume in the electrode matrix. In an embodiment of the invention we use polyelectrolytes to activate the carbon electrodes. One advantage of the polyelectrolytes is that they can adsorb onto the carbon particles, which helps prevent them from leaching out of the carbon electrode. An other advantage is that lower levels of polyelectrolytes are needed compared to monovalent salt used in conventional methods, because no material is wasted to fill up pore volume.

Polyelectrolyte

The polyelectrolytes can be both anionic or cationic. The carbon electrodes containing the polyelectrolytes can be used in FTC cells that are built either with or without ion selective membranes. In principle either anionic or cationic polyelectrolytes can be used for both the anode and the cathode. Also mixtures of anionic and cationic polyelectrolytes can be used as well as zwitterionic polymers for both the anode and the cathode. Nevertheless, it is desirable to use cationic polymers for the anode and anionic polymers for the cathode to obtain the highest increase in ion storage capacity.

Suitable cationic polyelectrolytes are, for example, nitrogen based polyelectrolytes. Commercially available polyelectrolytes of this type are poly ethylene imines, such as Lupasol (ex BASF), polyquaterniums, such as the Merquat polyquaterniums (ex Nalco), poly amines, and poly vinyl pyridine and its derivatives as well as cationic polyacrylamides, such as Accepta (ex Accepta).

Suitable anionic polyelectrolytes are sulphonated polymers and carboxylated polymers, and mixtures thereof. Commercially available anionic polyelectrolytes are polystyrene sulfonate, such as Flexan (ex National Starch) and polycarboxylates, such as the Sokolan series (ex Basf).

In an embodiment, both the cationic and anionic polyelectrolytes have a molecular weight of at least 200 D, at least 500 D, or at least 1000 D. In an embodiment, the molecular weight is not more than 5,000,000 D, less than 100,000 D, or less than 10,000 D. The polyelectrolytes can be homodisperse or polydisperse covering a broad molecular weight range.

In an embodiment, the polyelectrolyte is present in the coating in a concentration of at least 0.5%, at least 1%, at least 2% or at least 4% by weight of the dry coating. In an embodiment, the polyelectrolyte is present in a concentration of not more than 30%, not more than 20%, not more than 15%, or less than 10% by weight of the dry coating.

The amount of carbon and polyelectrolyte is adjusted so as to balance the capacitance of the anode and cathode electrodes. In practice this means that more polyelectrolyte and/or carbon is used for the anode than for the cathode electrode.

Binder

The binder may be any conventional adhesive. The binder is mixable with carbon material. In an embodiment, the binder is a water based adhesive. Binder systems may be selected for their ability to wet the carbon particle or current collector materials, or surfactants or other agents may be added to the binder mixture to better wet the carbon particles or graphite foil.

Suitable commercial binder materials are polyacrylic based binders such as the Fastbond range from 3M.

In an embodiment, the binder is present in the coating in a concentration of at least 1%, at least 2%, or at least 5% by weight of the dry coating. In an embodiment, the binder is present in the coating in a concentration of less than 50%, less than 40%, less than 30%, less than 20%, or less than 15% by weight of the dry coating.

Carbon

In an embodiment, the carbon in the coating comprises activated carbon, and optionally any other carbon material, such as carbon black. The activated carbon may be steam activated or chemically activated carbon, desirably steam activated carbon, such as DLC, A supra eur (ex Norit). In an embodiment, the carbon has a specific surface area of at least 500 m$^2$/g, at least 1000 m$^2$/g, or at least 1500 m$^2$/g. The anode and cathode may even be made out of different carbon materials. The higher the carbon surface area is, the higher is the ion storage capacity of the current collector.

The specific surface area of carbon may for instance be measured by the B.E.T. method, as commonly used in the art.

In an embodiment, the carbon is present in the coating in a concentration of at least 50%, at least 60%, at least 70%, or at least 75% by weight of the dry coating. The composition generally does not contain more than 98.5% by weight of the dry coating of carbon.

Solvent

The solvent, suitable for mixing the coating paste, may be any solvent suitable for dissolving the polyelectrolyte, desirably an aqueous solvent such as water. The solvent is generally evaporated from the paste to form a solid coating on the current collector. The evaporation may for instance be achieved by exposure to air (ambient or heated). The solvent may be present in an amount of 20-80% of the total paste, but is generally present in an amount of about 40-50% of the total paste, before drying. In an embodiment, after drying, the coating contains less than 25% solvent, less than 15% solvent, or less than 10% solvent.

Method

Figure 2:
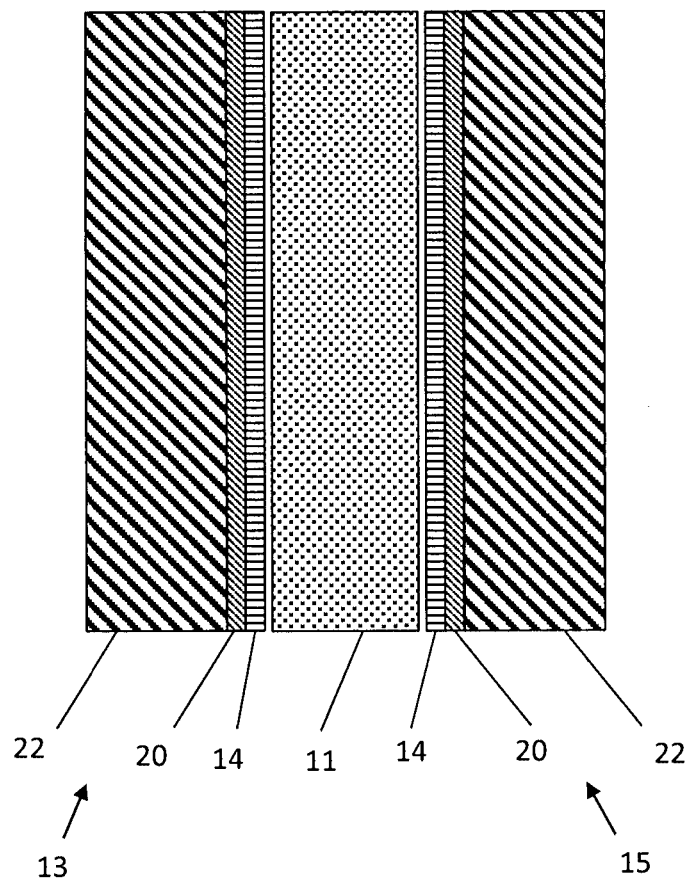
FIG. 2 shows a detail of an embodiment of an electrode of a flow-through capacitor.

In one embodiment, referring to FIG. 2, there is provided a method for preparing a coated current collector, comprising the steps of preparing a coating paste comprising:
  carbon;
  binder;
  polyelectrolyte; and
  solvent
applying the coating paste on a current collector 22; and drying the coated current collector.

In an embodiment, the current collector is coated on both sides. Without wishing to limit the invention, both sides of the current collector are usually coated with the same coating paste.

Dry Electrode

The dry electrode made by the method described herein, as coated onto the current collector, generally has a thickness of at least 50, at least 100, or at least 200 micrometers; and less than 1000, or less than 500 micrometers.

Commercially available electrodes, such as disclosed in US2005/0042513, typically have a specific capacitance of 10-25 F/g when applied to FTC. The electrodes of an embodiment of the present invention generally have a specific capacitance of more than 25 F/g or at least 30 F/g.

Current Collector

The current collector of an embodiment of the present invention may be any common type of current collector. The material of which the current collector is made, is a conducting material. Suitable materials are e.g. carbon, such as graphite, or carbon mixtures with a high graphite content, metal, such as copper, titanium, platinum, (stainless) steel, nickel and aluminium. The current collector is generally in the form of a sheet. Such sheet is herein defined to be suitable to transport at least 33 Amps/m$^2$ and up to 2000 Amps/m$^2$. When a surface of graphite foil is used, such surface may be corona treated, plasma etched, chemically or mechanically abraded or oxidized to enhance binder adhesion. The thickness of a graphite current collector then typically becomes from 100 to 1000 micrometers, generally 200 to 500 micrometers.

Charge Barrier Layer

Charge barriers have been disclosed in U.S. Pat. No. 6,709,560 for use in FTC. Referring to FIG. 2, an embodiment of the present invention provides a coated current collector, as disclosed herein above, further comprising a charge barrier 14 applied to the electrode coating layer 20, the charge barrier comprising a membrane, selective for anions or cations, the charge barrier being applied to the electrode coating layer as a further coating layer or as a laminate layer.

In another embodiment, there is provided a system comprising the coated current collector described herein, comprising carbon, binder and polyelectrolyte, in combination with a separate conventional charge barrier as disclosed in U.S. Pat. No. 6,709,560.

Suitable membrane materials may be homogeneous or heterogeneous. Suitable membrane materials comprise anion exchange and/or cation exchange membrane materials, desirably ion exchange materials comprising strongly dissociating anionic groups and/or strongly dissociating cationic groups. Examples of such membrane materials are Neosepta range materials (trademark, ex Tokuyama), the range of PC-SA and PC-SK (trademark ex PCA GmbH), ion exchange membrane materials ex Fumatec, ion exchange membrane materials Ralex (trademark, ex Mega) or the Excellion range of heterogeneous membrane material (trademark, ex Snowpure).

Stack

Referring to FIG. 1, an FTC 3 normally comprises at least one repeating unit of:
  anionic current collector/electrode 13
  optionally an anion exchange membrane as charge barrier 14
  conventional FTC spacer 11
  optionally a cation exchange membrane as charge barrier 14
  cathode current collector/electrode 15.

Typically the number of repeating units in a conventional FTC stack, as found in practice, is limited by the compression force. In practice this means that a conventional FTC stack comprises 1 to 20 repeating units. The novel coated current collectors have a lower contact resistance between electrode and current collector, resulting in a lower compression force per repeating unit. Therefore the compression force for the same number of repeating units can be lower, or the number of repeating units in the FTC can be increased at constant compression force. The number of repeating units in a FTC according to an embodiment of the invention is at least 1, at least 5, at least 10, or at least 20. For practical reasons, the number of repeating units is generally not more than 200, not more than 150, not more than 100, or not more than 50.

The stack according to an embodiment of the invention is typically compressed at a pressure of less than 0.3 bar, not more than 0.22 bar, not more than 0.17 bar, or less than 0.1 bar. In conventional FTC's the compression pressure is in the order of 0.3-1 bar.

The coated current collectors of an embodiment of the present invention enable the configuration of an FTC stack in spirally wound form, amongst others, due to their lower electrical contact resistance. In such spirally wound configuration, the FTC stack typically comprises at least 1 repeating unit. Typically the FTC stack in spirally wound form comprises less than 20 repeating units.

Applications of the Coated Current Collector FTC

The coated current collectors are useful in FTC devices that require low system cost for example in domestic appliances such as coffee makers, espresso machines, washing machines, dish washers, refrigerators with ice or water dispensers, steam irons, etc, where the removal of hardness ions such as calcium and magnesium, as well as other ions is beneficial. They can also be used for residential water treatment such as point of use devices as well as point of entry devices for whole households. These electrodes can also be used for commercial and industrial applications, e.g. water treatment in agriculture (e.g. treatment of ground water and surface water), boiler water, cooling towers, process water, pulp and paper, laboratory water, waste water treatment, mining as well as for the production of ultra pure water. Finally the electrodes may be used for the removal of problem ions such as nitrate in e.g. swimming pools and arsenic and/or fluoride in e.g. ground water.

An embodiment of the invention will now be illustrated by means of the following non-limiting examples.

Example 1

This example relates to the preparation of the carbon coating paste.

A formulation for 1 kg of activated carbon coating paste is given below. The level of polyelectrolyte in the paste depends on the required levels in the electrode. In the example below the polyelectrolyte level in the anode and cathode are respectively 14% w and 11% w.

Anode

For 1 kg of dry coating
140 g of polyethylenimine (PEI) branched Mw: 25000 (ex Sigma)
800 g of carbon A supra EUR (ex Norit)
60 g of binder: Fastbond 7434 (3M, 115 g of 52% in water)
2 liters of demineralised water The ingredients may be pre-dissolved in part of the water before mixing.

Cathode

For 1 kilogram of dry coating
110 g of poly(4-styrenesulfonate) Mw: 70000 (ex Sigma)
810 g of carbon A supra EUR (Norit).
80 g of binder: Fastbond 7434 (3M, 115 g of 52% in water)
2 liters of demineralised water The ingredients may be pre-dissolved in part of the water before mixing.

In an embodiment, the ingredients were mixed in the following order: polyelectrolyte, water, activated carbon and adhesive. The addition of the carbon was done in 3 steps. The solution/dispersion was mixed after each addition until a homogeneous paste is obtained. Mixing was done at low speed (around 80 rpm), especially after the additions of activated carbon and adhesive, whereas after 3 minutes, the speed was progressively increased to 140 rpm.

The resulting viscosity was about 4000 mPa·s, which is suitable to give good spreading upon coating. Finally, the carbon paste was mixed at room temperature at a speed of 140 rpm for at least 10 minutes until a homogeneous paste was obtained.

Example 2

This example relates to the manufacture of carbon coated electrodes and the comparison of the capacities of the electrodes according to an embodiment of the invention to the capacities of conventional electrodes.

An anionic coated current collector was prepared by applying the wet anode paste according to example 1 onto a graphite sheet at room temperature with a speed of 30-60 cm/min and a thickness of about 0.5 mm. The sheet with the wet coating was dried in approximately 30 min at 70° C. In the example, the coating is applied on one side of the graphite sheet.

The cathode is material PACMM-203 (ex Material Methods) activated with sodium chloride. The reference carbon layer for both anode and cathode is material PACMM-203 activated with sodium chloride. The carbon electrode (material PACMM-203) has been activated according to the following protocol:

Soaking carbon electrodes 2 hours in a 50% aqueous solution of ethanol.
Soaking carbon electrodes 4 hours in water
Soaking carbon electrodes 16 hours in a solution of 0.6 mol/L of NaCl In the FTC below the cathode reference consists of a graphite current collector and a conventional electrode of PACMM-203 (as above) on both sides.

A single-unit FTC-stack was set up by filling an electrolysis cell with:

anionic coated current collector
anion exchange membrane (Neosepta AM-1) as charge barrier
conventional FTC spacer
cation exchange membrane (Neosepta CM-1) as charge barrier
cathode reference Each of these layers has a surface area of 32 cm$^2$. The FTC cell was charged at 1.5 V at room temperature (ca 24° C.). The capacity was measured by desalination of an aqueous salt solution for 20 min. The FTC was fed at a flow rate of 4.8 ml/min. To keep all parameters equal, the FTC stacks of both the examples and the comparative examples were compressed to a pressure of $0.35 \cdot 10^5$ Pa (=0.35 bar), i.e. a pressure suitable for conventional FTC's.

The aqueous salt solution is a solution of 12 mM NaCl in demineralised water with a resultant conductivity of 1200 microS/cm (at room temperature).

The FTC of the comparative example contained a reference carbon electrode/current collector for both the anode and the cathode. The FTC's of the examples contained the anionic carbon coated current collector as anode as explained above and the same carbon electrode/current collector as the reference FTC as cathode.

The conductivity of the stream at the exit port of the FTC was measured. From the conductivity of the exit stream, the capacity of the electrodes was calculated as common to the skilled person, by first determining the amount of ions stored on the electrodes using a calibration curve of conductivity of an aqueous salt solution as a function of the salt concentration. The conductivity of the exit stream is plotted as well as the reference baseline of the feed stream. The amount of stored ions (F in mol ions per g activated carbon) is defined as the area between the said curves. The capacity C is calculated by multiplying F by the Faraday constant (F) and dividing by the applied electrical potential (V):

$$C = \Gamma * F / V$$

Where C is the sum capacity of the anode capacity ($C_{anode}$) and the cathode capacity ($C_{anode}$) defined by $$1/C = 1/C_{Anode} + 1/C_{Cathode}$$

Results

CAPACITY: NaCl removed (F/g carbon)

| Time (min) | Comparative example | \multicolumn{5}{c}{Examples: Level of polyelectrolyte (%) coatings} |
|---|---|---|---|---|---|---|
| | | 7.7 | 14.5 | 18.0 | 20.6 | 27.5 |
| 1 | 4.18 | 6.07 | 5.87 | 5.74 | 7.55 | 5.74 |
| 2 | 8.61 | 12.74 | 12.38 | 12.00 | 15.43 | 12.14 |

-continued

Results

CAPACITY: NaCl removed (F/g carbon)

| Time (min) | Comparative example | Examples: Level of polyelectrolyte (%) coatings | | | | |
|---|---|---|---|---|---|---|
| | | 7.7 | 14.5 | 18.0 | 20.6 | 27.5 |
| 3 | 12.36 | 18.56 | 17.88 | 17.41 | 21.76 | 17.84 |
| 4 | 15.21 | 23.46 | 22.10 | 21.97 | 26.52 | 22.38 |
| 5 | 17.34 | 27.29 | 25.32 | 25.74 | 30.00 | 25.78 |
| 6 | 18.91 | 30.18 | 27.80 | 28.86 | 32.53 | 28.27 |
| 8 | 21.09 | 34.20 | 31.28 | 33.49 | 36.04 | 31.58 |
| 10 | 22.44 | 36.87 | 33.48 | 36.37 | 38.35 | 33.52 |
| 15 | 24.08 | 40.27 | 36.01 | 39.35 | 41.17 | 35.60 |
| 20 | 24.36 | 40.95 | 36.50 | 39.79 | 41.72 | 35.89 |

It is noted that the full capacity is reached after about 15 minutes.

The results table above shows that the FTC with the carbon coated current collector anode according to an embodiment of the invention reaches a higher capacity than the FTC according to the state of the art (comparative).

The invention claimed is:

1. A flow through capacitor comprising a stack of at least one repeating unit comprising:
    an anode;
    a spacer; and
    a cathode,
    wherein the anode comprises a coated anode current collector comprising an anode current collector and an anode electrode coating, the anode electrode coating comprising 50-98.5 dry mass weight % of carbon having a specific surface area of at least 500 m$^2$/g, 1-40 dry mass weight % of binder, and 0.5-30 dry mass weight % of cationic polyelectrolyte, wherein the cationic polyelectrolyte is adsorbed onto the carbon; and/or
    the cathode comprises a coated cathode current collector comprising a cathode current collector and a cathode electrode coating, the cathode electrode coating comprising 50-98.5 dry mass weight % of carbon having a specific surface area of at least 500 m$^2$/g, 1-40 dry mass weight % of binder, and 0.5-30 dry mass weight % of anionic polyelectrolyte, wherein the anionic polyelectrolyte is adsorbed onto the carbon.

2. The flow through capacitor (FTC) according to claim 1, wherein the FTC is in spirally wound form.

3. The flow through capacitor (FTC) according to claim 1, wherein the stack is compressed at a pressure of less than 0.3 bar.

4. The flow through capacitor (FTC) according to claim 2, wherein the stack is compressed at a pressure of less than 0.3 bar.

5. The flow through capacitor (FTC) according to claim 1, wherein the anode, or the cathode, or both the anode and cathode, has a specific capacitance of more than 25 F/g.

6. The flow through capacitor (FTC) according to claim 1, wherein the carbon comprises activated carbon.

7. The flow through capacitor (FTC) according to claim 1, wherein the electrode coating has a thickness selected from the range of 50-1000 micrometers.

8. The flow through capacitor (FTC) according to claim 1, comprising both the coated anode current collector and the coated cathode current collector.

9. A method comprising:
    assembling a flow through capacitor comprising a stack of at least one repeating unit comprising an anode, a spacer and a cathode,
    wherein the anode comprises a coated anode current collector comprising an anode current collector and an anode electrode coating, the anode electrode coating comprising 50-98.5 dry mass weight % of carbon having a specific surface area of at least 500 m$^2$/g, 1-40 dry mass weight % of binder, and 0.5-30 dry mass weight % of cationic polyelectrolyte, wherein the cationic polyelectrolyte is adsorbed onto the carbon; and/or
    the cathode comprises a coated cathode current collector comprising a cathode current collector and a cathode electrode coating, the cathode electrode coating comprising 50-98.5 dry mass weight % of carbon having a specific surface area of at least 500 m$^2$/g, 1-40 dry mass weight % of binder, and 0.5-30 dry mass weight % of anionic polyelectrolyte, wherein the anionic polyelectrolyte is adsorbed onto the carbon.

10. The method according to claim 9, wherein the anode, or the cathode, or both the anode and cathode, has a specific capacitance of more than 25 F/g.

11. The method according to claim 9, wherein the carbon comprises activated carbon.

12. The method according to claim 9, wherein the electrode coating has a thickness selected from the range of 50-1000 micrometers.

13. The method according to claim 9, comprising both the coated anode current collector and the coated cathode current collector.

14. The method according to claim 9, further comprising preparing the coated current collector, the preparing comprising:
    preparing a coating paste comprising:
        dry coating materials comprising:
            50-98.5 dry mass weight % of carbon having a specific surface area of at least 500 m$^2$/g,
            1-40 dry mass weight % of binder,
            0.5-30 dry mass weight % of polyelectrolyte, and
            20-80% based on the total paste of solvent;
    applying the coating paste onto a current collector; and
    drying the coated current collector.

15. The method according to claim 9, further comprising compressing the stack at a pressure of less than 0.3 bar.

16. A method comprising:
    flowing fluid in a flow through capacitor comprising a stack of at least one repeating unit, the at least one repeating unit comprising an anode, a spacer, and a cathode,
    wherein the anode comprises a coated anode current collector comprising an anode current collector and an anode electrode coating, the anode electrode coating comprising 50-98.5 dry mass weight % of carbon having a specific surface area of at least 500 m$^2$/g, 1-40 dry mass weight % of binder, and 0.5-30 dry mass weight % of cationic polyelectrolyte, wherein the cationic polyelectrolyte is adsorbed onto the carbon; and/or
    the cathode comprises a coated cathode current collector comprising a cathode current collector and a cathode electrode coating, the cathode electrode coating comprising 50-98.5 dry mass weight % of carbon having a specific surface area of at least 500 m$^2$/g, 1-40 dry mass weight % of binder, and 0.5-30 dry mass weight % of anionic polyelectrolyte, wherein the anionic polyelectrolyte is adsorbed onto the carbon; and
    applying a potential difference between the anode and the cathode to remove ions from the fluid.

17. The method according to claim 16, wherein the anode, or the cathode, or both the anode and cathode, has a specific capacitance of more than 25 F/g.

18. The method according to claim 16, wherein the carbon comprises activated carbon.

19. The method according to claim 16, wherein the electrode coating has a thickness selected from the range of 50-1000 micrometers.

20. The method according to claim 16, comprising both the coated anode current collector and the coated cathode current collector.

* * * * *